United States Patent Office 3,623,433
Patented Nov. 30, 1971

3,623,433
CIRCUITS FOR TRACK GUIDED AIR CUSHION
VEHICLE PROPULSION SYSTEM
Edward Alfred Keith Jarvis, Hale, England, assignor to
Tracked Hovercraft Limited, London, England
Filed Oct. 15, 1969, Ser. No. 866,494
Int. Cl. B60l 9/18, 13/00
U.S. Cl. 104—148 LM                                                              4 Claims

ABSTRACT OF THE DISCLOSURE

A track guided air cushion vehicle is propelled by a linear induction motor. D.C. is supplied along the track, and the air cushion devices are supplied with air from D.C. operated fan motors. An inverter converts the D.C. main supply to A.C. for the linear motor during normal operation. The fan motors are in addition connected to a portion of the inverter in such a way that the inverter can be used optionally as a D.C. chopper to supply D.C. at a progressively increasing voltage for starting the fan motor.

---

This invention relates to a vehicle which is propelled by an electric induction motor and which is supported over a prepared track on a cushion of air.

The general concept of a track guided air cushion vehicle (i.e. a vehicle which travels over a prepared track supported at least partially from the track by at least one cushion of air) which is driven by an electric induction motor, particularly a linear induction motor, is described in a paper by Mr. D. S. Bliss in "Hovering Craft and Hydrofoil" January, February and March issues 1962.

The invention is particularly concerned with such a vehicle for which the induction motor is supplied with alternating current converted from direct current by an inverter and which has direct current electric motors to drive the fans which supply air to the air cushion devices.

According to the invention, a track guided air cushion vehicle includes an induction motor stator for propelling the vehicle, at least one D.C. fan motor for supplying pressurised air for the air cushion, and an inverter unit for converting a direct current main power supply to alternating current for the motor stator, in which the inverter unit and the fan motor are so arranged that a portion of the inverter unit can be used optionally as a direct current chopper to supply direct current at a progressively increasing voltage for starting the fan motor.

Thus the invention stems from realising that, by suitable arrangement of the inverter unit and the fan motor, the devices that would otherwise have been needed for starting the fan motor can be dispensed with.

The preferred arrangement of the inverter unit and fan motor is to have the armature of the fan motor connected across the D.C. supply via a first contactor on one side of the armature, and to have an electrical connection with a second contactor therein extending between said one side of the armature and a point on the inverter circuit between a thyristor and a rectifier which are connected to each other across the D.C. supply, whereby, where said first contactor is open and the second contactor is closed, said armature, said thyristor and said rectifier constitute a D.C. chopper for supplying D.C. at a progressively increasing voltage for starting the fan motor.

Preferably the induction motor stator is a linear induction motor stator, and the rotor of the linear motor with which the stator co-operates in use is in the form of an elongated rail, which may for example be of aluminium, extending along the track.

Figure 1:
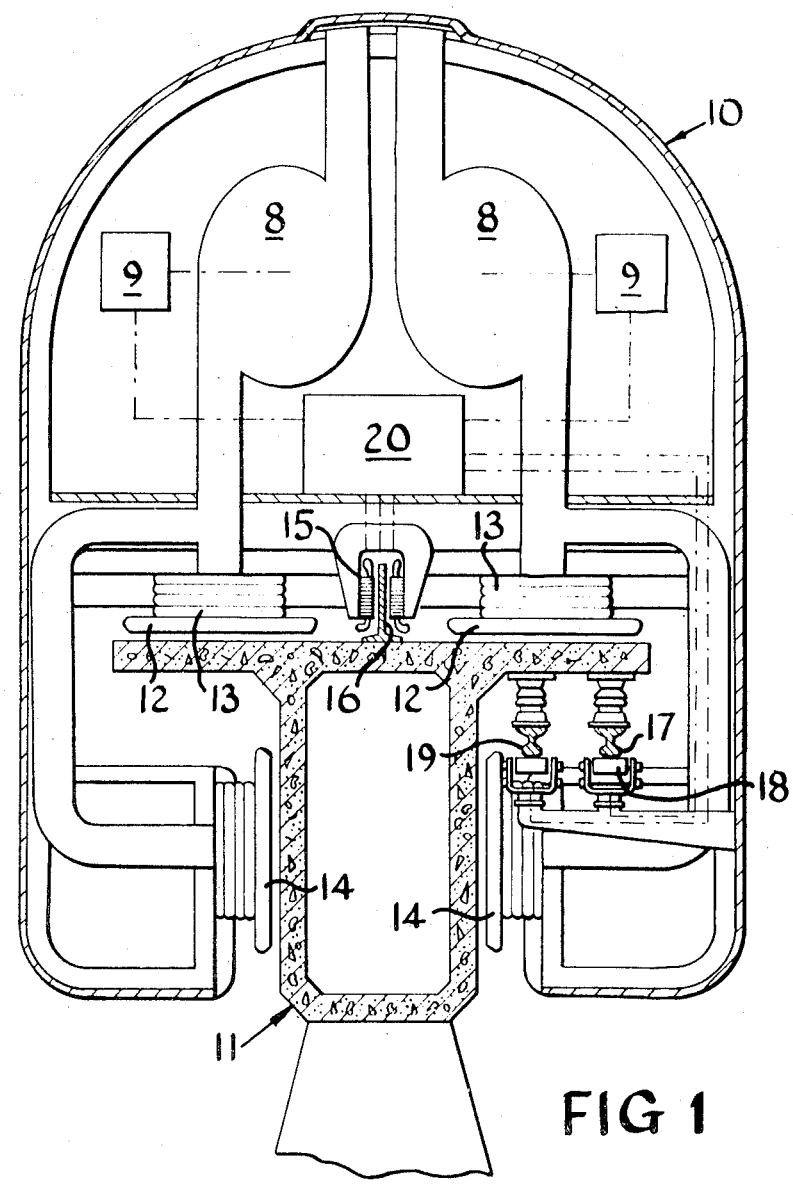
Figure 2:
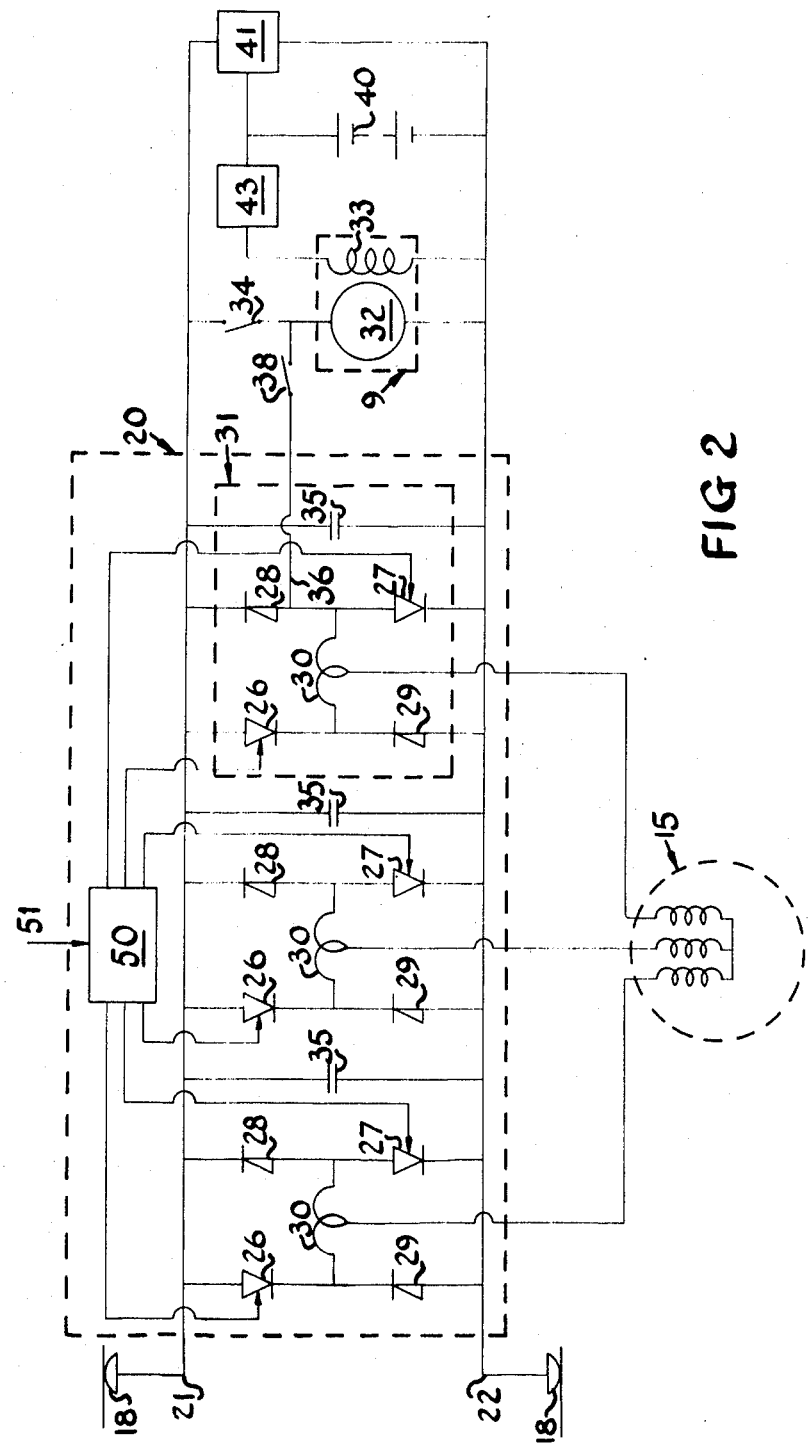

In the accompanying drawings:

FIG. 1 is a lateral cross-section of a linear motor propelled tracked hovercraft embodying the invention mounted on its track, and FIG. 2 is a simplified circuit diagram for the vehicle of FIG. 1 leaving out items not essential to the understanding of the invention.

The track guided air cushion vehicle in FIG. 1 includes a body 10 supported over a prepared concrete track 11 on air cushion devices 12 supplied with air via ducts 13. Lateral stability is provided for by guidance air cushion devices 14 co-operating with the track 11 and the vehicle is driven by a linear induction motor having a stator 15 of the double sided type connected to the vehicle and straddling an aluminium reaction rail or secondary member 16. Direct current is supplied to the vehicle via a conductor rail 17 attached to the track 11, the current being collected through collector shoes 18 and returned through similar shoes in contact with the return rail 19.

Air is supplied to the cushion devices 12 and 14 by means of an appropriate number of fans 8, each of the fans 8 being driven by a direct current motor 9. A thyristor inverter unit 20 is carried on board the vehicle 10 for converting the main power supply of direct current collected by the vehicle to an alternating current supply for the linear motor stator 15.

In FIG. 2, the linear motor stator 15 is represented electrically in the conventional way. The D.C. supply collected by the shoes 18 is applied between the positive and negative terminals 21 and 22 respectively.

There are three conventionally arranged sets of thyristors and rectifiers or diodes forming the basic elements of the thyristor inverter unit 20. Each set of thyristors and diodes is shown in simplified form as a pair of thyristors 26 and 27 and a pair of diodes 28 and 29 arranged as shown in relation to an inductor 30. The D.C. supply across terminals 21 and 22 is converted to variable frequency 3-phase A.C. which is applied to the linear induction motor 15 as shown for propelling the vehicle. For braking the vehicle the linear motor operates regeneratively in a known manner.

The fan motors 9 have armatures 32 and field windings 33. When the motors 9 are up to speed the armatures 32 are connected across the D.C. supply via contactors 34. The field winding 33 of the motors 9 are supplied with current via an excitation control unit 43 from a high to low voltage converter 41. A battery 40 is also connected in the circuit as indicated.

The remaining circuitry including power switches, protection relays, etc., is not shown but may be quite conventional.

By providing an electrical connection 36 with a contactor 38 extending between the side of the armature 32 on which is disposed the contactor 34 and a point on a portion of the inverter unit between a thyristor 26 and a rectifier 29 which are connected to each other across the D.C. supply the inverter unit serves a dual function. It operates in the conventional manner to produce three phase A.C. for the linear motor 15 when the fan motors 9 are up to speed and alternatively supplies D.C. for starting the fan motors 9 at the required varying voltage, without the necessity of the conventional voltage dropping resistors.

When D.C. is initially applied to the vehicle across terminals 21 and 22 it should not be applied directly to the fan motor armatures 32 by closing contactors 34 because an excessive current would flow. Conventionally, a starting resistor and starting contactors would be employed to run the fan motors progressively up to speed but the present invention offers a method which avoids the weight and space necessary for these items.

According to the invention and as shown in the figure the fan motors 9 are connected, when starting, by contactors 38 and by the connection 36 to one section 31 of the three sections of the inverter unit 20 which is arranged to act as a direct current chopper to increase progressively the voltage applied to the fan motors as they increase speed on starting.

A D.C. chopper is a known device for converting a D.C. nominally fixed voltage supply into a variable direct mean voltage by chopping the voltage so as to apply the voltage to the load for a varying proportion of the total time. By progressively increasing the portion of "on" time a progressively increasing mean voltage can be applied to the load.

A known D.C. chopper circuit can essentially take the form of a thyristor in series with the largely inductive motor load and a diode, the thyristor and diode being so arranged in relation to each other that should the thyristor be turned off the diode provides a freewheel path for the load current which circulates through the load and the diode being substantially maintained for a limited time by the inductance of the load and any other inductance in the circulating path. The D.C. chopper is operated by progressively increasing the time in each cycle that the thyristor is in an on condition.

It can be seen from FIG. 2 that if contactor 34 is open and contactor 38 is closed, diode 29 and thyristor 26 within the inverter section 31 together with the armature 32, supplemented by the inductor 30, form the essential components of a chopper circuit. An electric current passing through the thyristor 26 can flow via the inductor 30 along the line 36 and thence through the armature 32 of the fan motors 9. When the said thyristor 26 is in an off condition the load current circulates through the diode 29, inductor 30, the line 36 and thence through the armatures 32. Thus by progressively increasing the time that the thyristor is in an on condition, a progressively increasing voltage is applied to the fan motor 9. Turning off the thyristor 26 during chopping is effected in known manner by circuitry which is provided in the inverter 20 for its normal operation and which acts to apply reverse volts to the thyristor 26.

Although the line 36 is shown connected to a point between the thyristor 26 and rectifier 29 via the inductor 30 it could be connected to the point between the thyristor 26 and rectifier 29 bypassing the inductor 30. The inclusion of the inductor 30 is advantageous however as the inductor 30 acts as a smoothing reactor when starting the fan motor 9.

When the fan motors are up to speed contactors 38 are opened and contactors 34 closed thus connecting the fan motors 9 across the main D.C. supply, the preferred sequence being to close the contactors 34 before opening the contactors 38.

In normal operation the firing circuit within the inverter 20 for the thyristors 26 and 27 includes a control device 50 which receives an input signal 51 indicative of the desired vehicle speed and automatically adjusts the inverter frequency accordingly. When, however, it is desired to start the fan motors 9 the control device 50 is adapted so that all the thyristors 26 and 27 are in the off condition except for the thyristor 26 in the inverter part 31. The input to the control unit 50 then responds to the requirements for fan motor starting and the control unit 50 controls the firing of the thyristor 26 in the inverter part 31 accordingly. The control unit 50 can be arranged to operate in the required manner by conventional means which need therefore not be described.

I claim:

1. A track guided air cushion vehicle adapted for operation along a prepared track having at least one fan and a D.C. fan motor for generating and maintaining at least one cushion of pressurised gas at least partly spacing the vehicle from the track, a source of D.C. electric power supply, and a linear induction motor stator for propelling the vehicle along the track by co-operation with a linear induction motor reaction rail extending along the track, wherein the improvement comprises a static inverter unit having its input connected to the D.C. power supply and its output connected to the linear induction motor stator for supplying A.C. electric power thereto, said inverter unit comprising a plurality of controllable rectifiers each controllable between a conductive and a non-conductive state, a portion of said inverter unit forming a D.C. chopper circuit for supplying D.C. to the fan motor at a progressively increasing voltage during starting of the motor, said portion comprising a said controllable rectifier and a further rectifier associated therewith for providing a path for the flow of fan motor armature current when the controllable rectifier is non-conductive, the vehicle further comprising switching means operable for starting the fan motor by connecting said motor in series with said controllable rectifier across the D.C. supply, whereby to enable the said progressively increasing mean voltage to be applied to the fan motor by control of the conduction periods of said controllable rectifier.

2. A vehicle according to claim 1 wherein, during normal operation, the inverter unit and the fan motor are supplied in parallel by the D.C. supply, the switching means comprising a first switching device between one terminal of the fan motor and an associated line of the D.C. supply, and a second switching device between the said terminal of the fan motor and that side of the controllable rectifier which is remote from the said line of the D.C. supply.

3. A vehicle according to claim 1 wherein the inverter unit includes a plurality of inductors connected in series with the controllable rectifiers, and the linear induction motor stator is connected to the inverter unit at the centers of said inductors, the inductor associated with the rectifier in the D.C. chopper circuit being in series with the said rectifier and the fan motor across the D.C. supply during starting of said motor.

4. A vehicle according to claim 1 including a battery connected to the field winding of the fan motor for separate energisation thereof.

References Cited

UNITED STATES PATENTS

| | | | |
|---|---|---|---|
| 3,317,802 | 5/1967 | Ogden | 318—102 |
| 3,354,370 | 11/1967 | Corry et al. | 318—227 |
| 3,361,081 | 1/1968 | Bliss | 104—148 |
| 3,384,804 | 5/1968 | Salihi | 318—227 |

DRAYTON E. HOFFMAN, Primary Examiner

U.S. Cl. X.R.

104—23 FS; 310—13; 318—227

PO-1050
(5/69)

UNITED STATES PATENT OFFICE
CERTIFICATE OF CORRECTION

Patent No. 3,623,433          Dated November 30, 1971

Inventor(s) Edward Alfred Keith Jarvis

It is certified that error appears in the above-identified patent and that said Letters Patent are hereby corrected as shown below:

Column 1, in the heading following "Filed Oct. 15, 1969, Ser. No. 866,494" insert --Claims priority, application Great Britain, Oct. 16, 1968, No. 49019/68--.

Signed and sealed this 30th day of May 1972.

(SEAL)
Attest:

EDWARD M. FLETCHER, JR.          ROBERT GOTTSCHALK
Attesting Officer          Commissioner of Patents